Jan. 4, 1938.　　　　R. S. ELLIS　　　　2,104,537
METHOD OF AND MEANS FOR SEPARATING PARTICLES
OF SOLID MATERIAL BY FLOTATION
Filed Feb. 12, 1937　　　6 Sheets-Sheet 1
FIG. I.
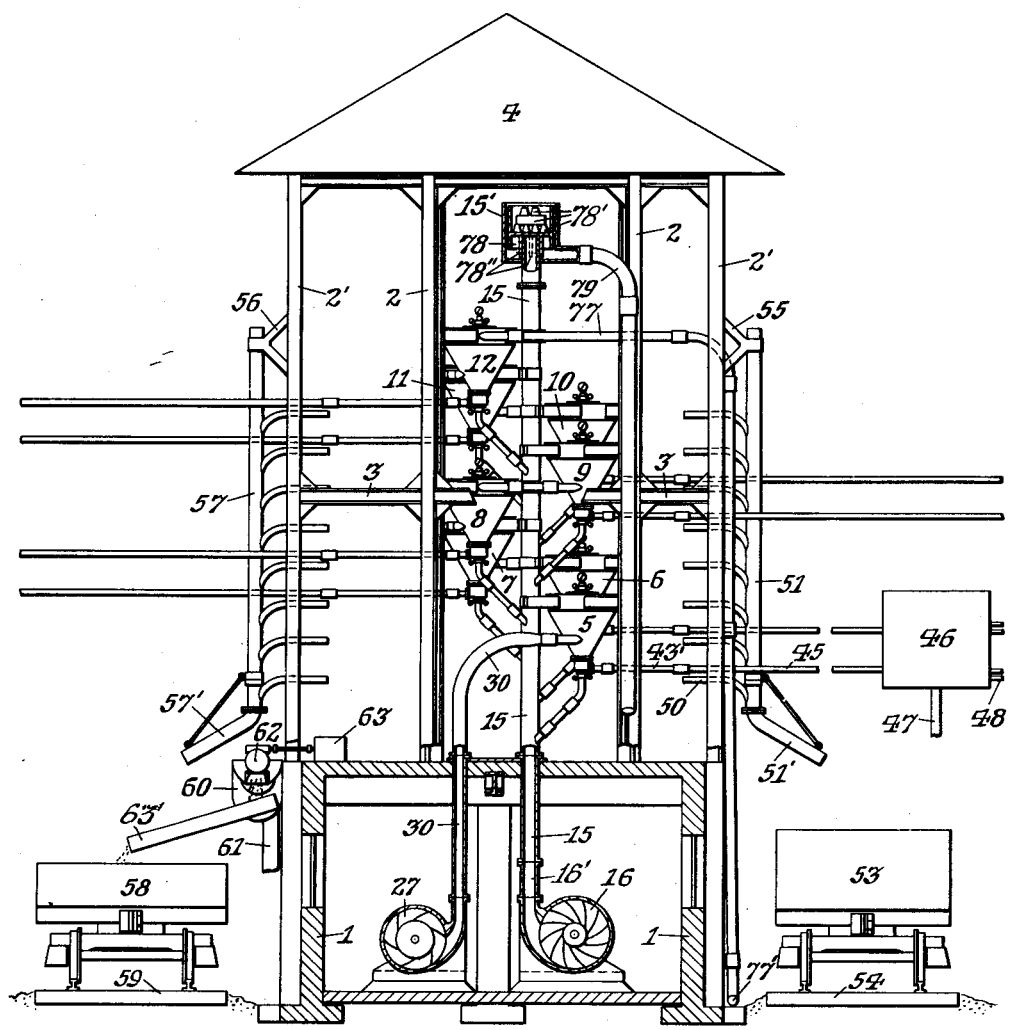
INVENTOR:
RUSSELL SCOTT ELLIS,
BY

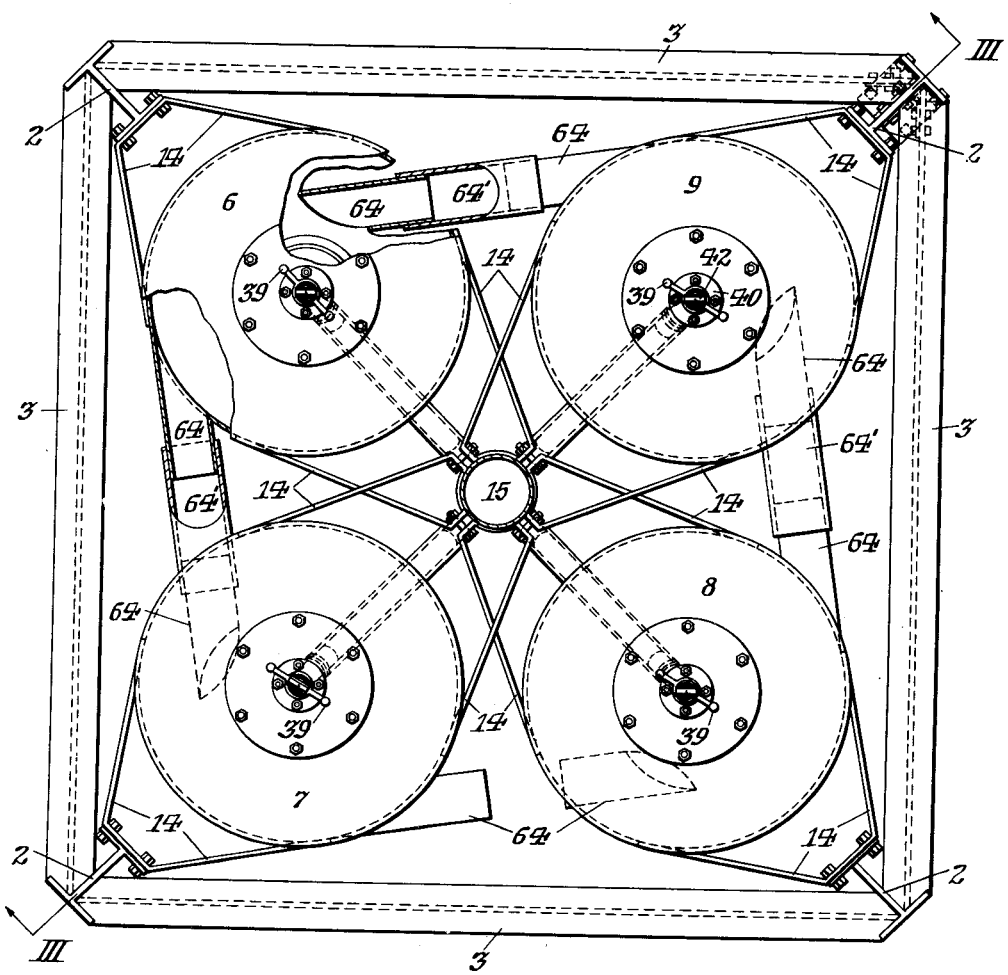

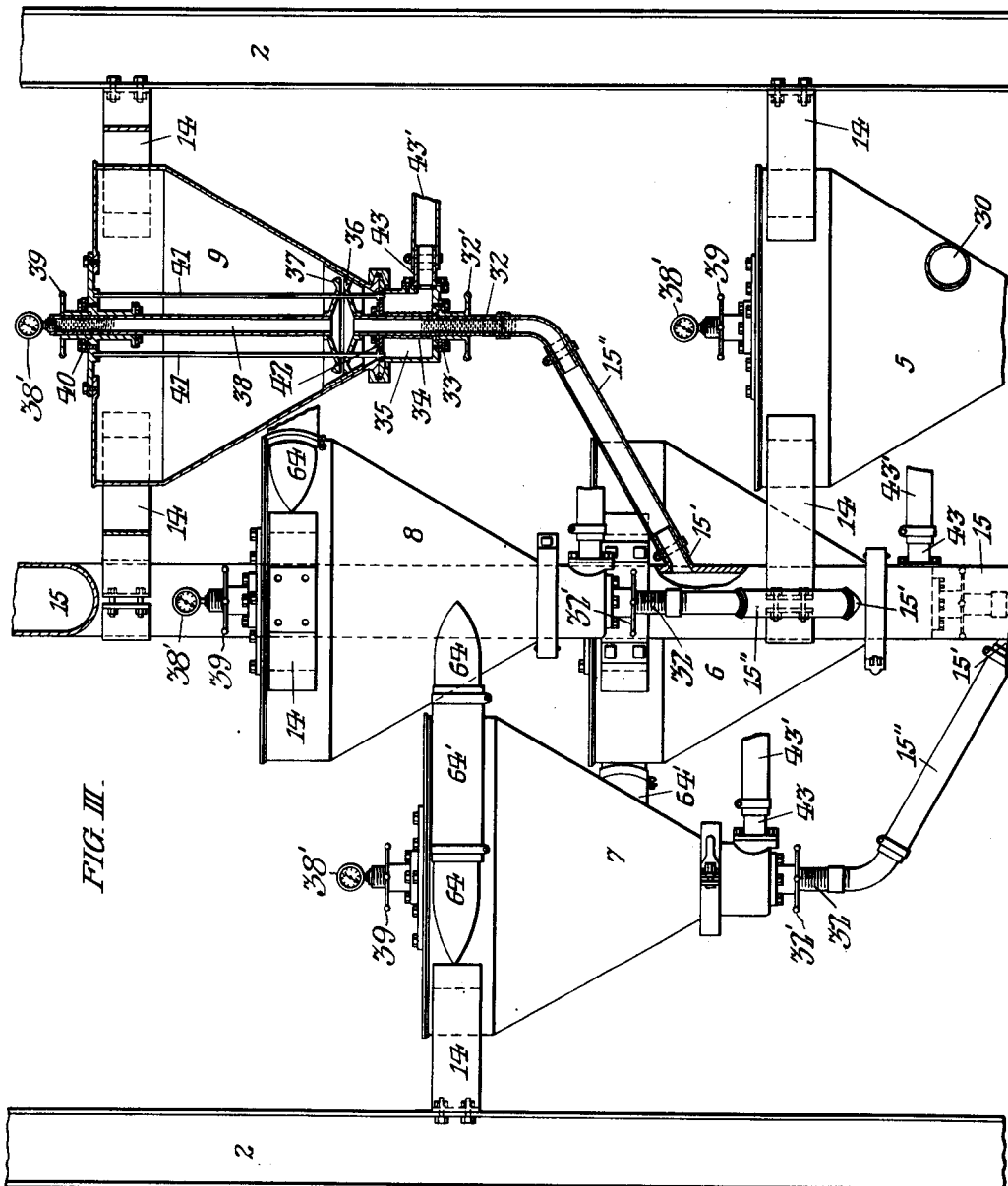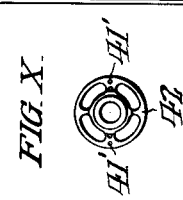

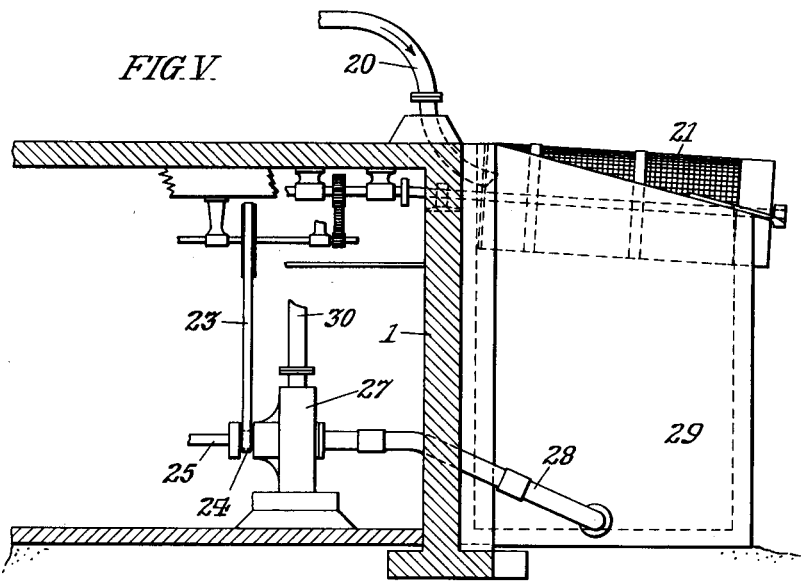
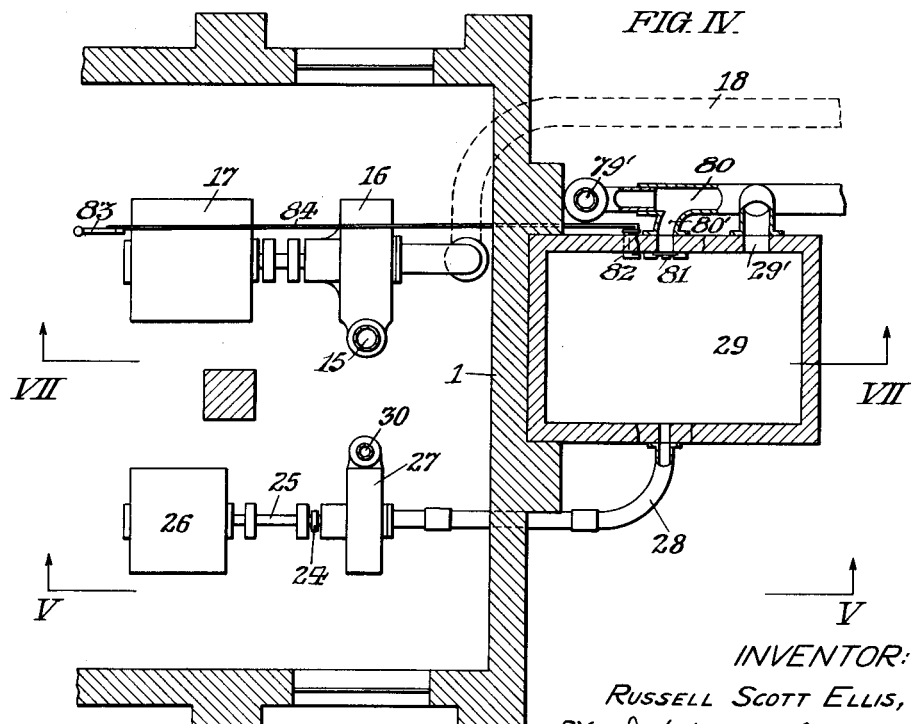

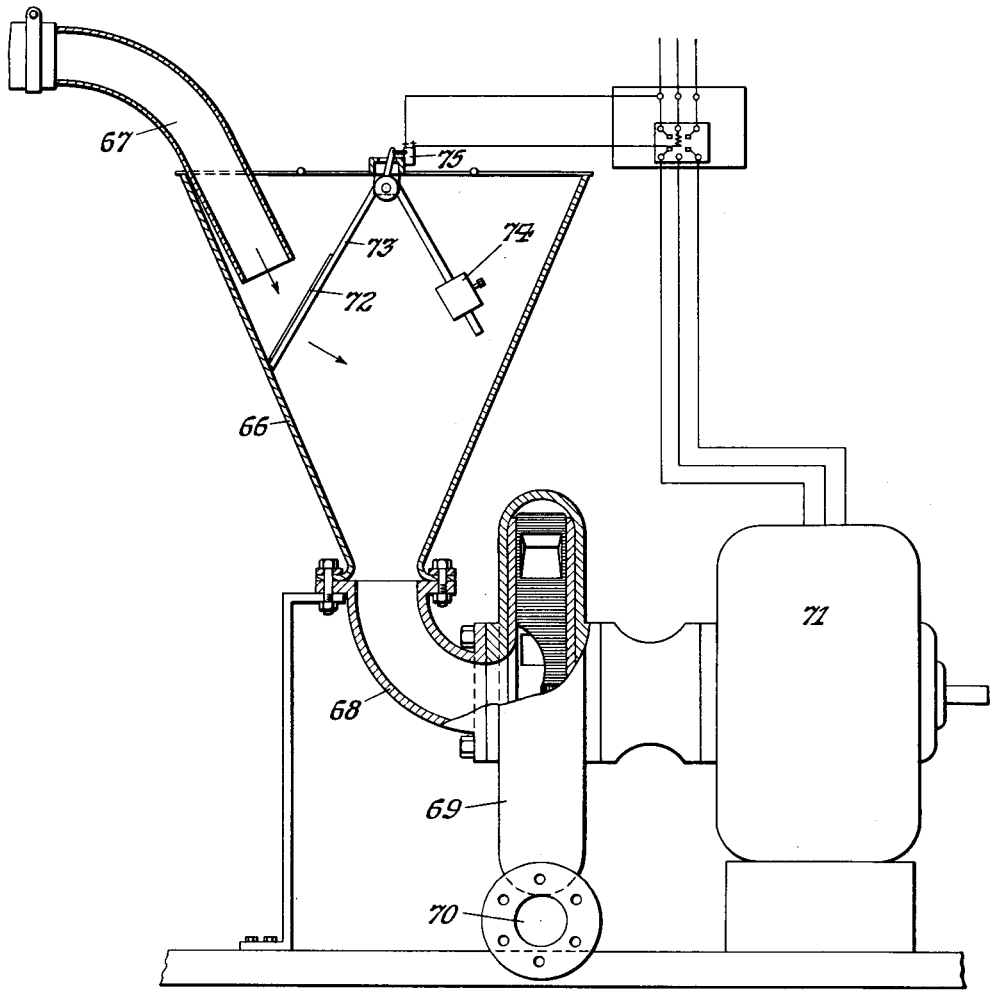

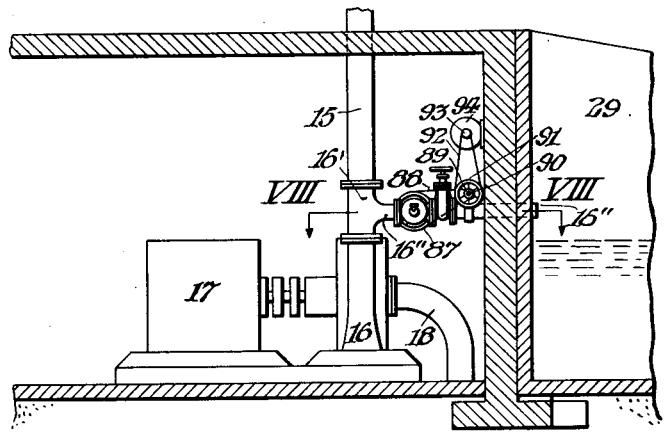
FIG.VII.
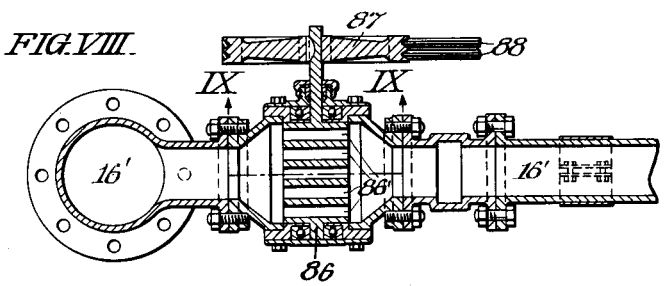
FIG.VIII.
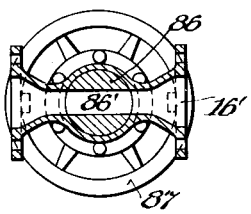
FIG.IX.

Patented Jan. 4, 1938

2,104,537

UNITED STATES PATENT OFFICE 2,104,537

METHOD OF AND MEANS FOR SEPARATING PARTICLES OF SOLID MATERIAL BY FLOTATION

Russell Scott Ellis, Vineland, N. J.

Application February 12, 1937, Serial No. 125,411

9 Claims. (Cl. 209—211)

My invention is applicable to any material particles of different sizes or specific gravity, or both, for instance natural sands, comminuted stone, coal, vegetable grains, or any other substance; by the application thereto of water or other fluid, or mixture of fluids, under pressure, to effect flotation thereof. My invention is advantageous in that the materials treated are not only classified by separation with reference to the different sizes or specific gravity of their particles, but gangue or other refuse material eliminated therefrom, and the selected particles washed, if the fluid employed is a liquid. For instance, application of my invention to the treatment of coal not only effects separation of the latter into desired different commercial classes with respect to size of the pieces but eliminates therefrom fragments of slate and other incombustible minerals. It is applicable to materials of less specific gravity, in a dry state, by use of atmospheric air, or other fluids, under pressure, to effect flotation thereof.

As hereinafter described, an essential feature of my invention is the provision of a plurality of distinct receptacles for the material to be treated, disposed in a vertical series and connected in series relation by conduits through which solid material which is not precipitated in the lowermost receptacle is delivered into the next higher receptacle, and the material which is not precipitated in the second receptacle is delivered into a third receptacle, and so on; the materials precipitated in the several receptacles being discharged separately from the bottoms thereof, and the finest material, finally separated by flotation, being discharged from the top receptacle.

In the form of my invention chosen for illustration, each of the receptacles is circular in configuration with respect to a vertical axis, and material under treatment is introduced to the lowest receptacle tangentially, and the delivery from one receptacle to the next higher in the series is likewise effected tangentially with respect to the receptacle from which it is discharged.

To facilitate the discharge of the precipitated material from said receptacles, they are conveniently conically shaped with their apices downward. Moreover, the fluid for flotation is preferably introduced axially upwardly, at the apex of the lowest receptacle, and distributed laterally therein between horizontal circular jet plates which may be axially adjustable to determine and limit the velocity of the fluid passed between them into the receptacles. Adjunctive features of my invention are, first, means to variably limit, predetermine and control the back pressure of the flotation fluid, and second, means to cause rhythmic pulsatory fluctuations in such pressure, in the individual separators.

My invention includes the various novel features of construction and arrangement of apparatus and methods of employing the same, as herein set forth.

In said drawings; Fig. I is a diagrammatic elevation, partly in section, of apparatus exemplifying my invention, particularly designed to employ water as a flotation and cleansing fluid.

Fig. II is a diagrammatic plan view of apparatus shown in Fig. I wherein a series of such receptacles is supported in a tower and in spiral and symmetrical relation to the vertical axis of the tower.

Fig. III is a fragmentary vertical sectional view of the structure shown in Figs. I and II, taken on the diagonal line III, III, in Fig. II in the direction of the arrows on said line.

Fig. IV is a sectional plan view of a building including a surge tank in which any material, for instance natural sand, from a dredge, may be received and subjected to the preliminary action of water, and showing pumps respectively for elevating the material from such surge tank to the lowermost separator receptacle in said series, and a pump for supplying water to said receptacle.

Fig. V is a fragmentary vertical sectional view taken on the line V, V, in Fig. IV, in the direction of the arrows on said line, showing a side elevation of said surge tank, and of a rotary screen through which the raw material is introduced thereto.

Fig. VI is a diagrammatic elevation, partly in section, showing means for forcibly delivering, to a stock pile, car or truck, the material separated by the apparatus shown in Figs. I to III inclusive.

Fig. VII is a fragmentary vertical sectional view taken on the line VII, VII, in Fig. IV, in the direction of the arrows on said line, but on a slightly smaller scale, showing the centrifugal pump for raising water from a subjacent source and forcing it upwardly through the central vertical supply conduit shown in Figs. I and II, leading to the vertical series of separator receptacles and also showing a side elevation of the valve means for causing a rhythmic pulsatory fluctuation of pressure in said conduit and said receptacles connected therewith.

Fig. VIII is a fragmentary plan sectional view taken on the line VIII, VIII, in Fig. VII, and showing said conduit and valve on a larger scale.

Fig. IX is a vertical sectional view taken on the line IX, IX, in Fig. VIII, showing said valve, detached.

Fig. X is a plan view of the circular bearing plate shown in Fig. III for supporting the lower ends of guide rods for the opposed jet plates.

Referring to Figs. I and II; the masonry base pump chamber 1 supports the metallic tower comprising the four vertical I-beam columns 2 connected by horizontal girders 3 capped by the overhanging roof structure 4, which is also supported by the additional columns 2' shown in Fig. I. Said tower supports eight conical separator receptacles 5, 6, 7, 8, 9, 10, 11, and 12, which are similar in construction but disposed at successively higher levels in said tower in a helically ascending series.

As best shown in Fig. II; said separators are supported in connection with said columns 2 by horizontal braces 14 extending from them to said columns 2 and to the central column 15 which is a cylindrical pipe through which the classifying fluid, for instance water, is supplied by the centrifugal pump 16 fixed in said chamber 1 as shown in Figs. I and IV. As shown in Fig. IV; said pump 16 is conveniently actuated by the electric motor 17 and receives the classifying fluid through the conduit 18 extending exterior to said chamber 1 to any suitable source of supply, for instance a subjacent body of water.

The material to be classified, for instance sand, is injected through the conduit 20 shown in Fig. V, into the interior of the screen 21. Said screen is conveniently of the rotary type turned by the means indicated in Fig. V including the belt 23 driven by the pulley 24 on the armature shaft 25 of the electric motor 26 shown in Fig. IV, which also drives the centrifugal pump 27. Said pump 27 has the intake conduit 28 extending from the bottom of the tank 29 into which the material to be classified gravitates from said screen 21 with the water by which it has been delivered into said screen. Said pump 27 has the discharge conduit 30 which as shown in Fig. I extends through the top of the pump chamber 1 and tangentially into the conical side of the lowermost separator 5.

Each of said separators is constructed and arranged as shown in detail in the separator 9 in Fig. III. Each separator is supplied with classifying fluid, for instance water, through an individual branch 15' extending laterally from said central supply column 15, and including a length of flexible hose 15" coupled with the vertical conduit 32 which axially extends into the separator and is vertically axially adjustable by the nut wheel 32' which is in screw threaded engagement with the exterior of said conduit 32 and has a flange at its upper end mounted to rotate in the bearing 33. Said conduit 32 extends through the stationary sleeve 34 in the outlet fitting 35 at the bottom of the separator, and has at its upper end the fluid spreader jet plate 36 opposed to the oppositely counterpart fluid spreader jet plate 37 fixed upon the lower end of the vertical tube 38 which is axially adjustable in the separator by means of the nut wheel 39 at the upper end thereof which is in screw threaded engagement with said tube 38 and mounted to turn in the bearing 40 on the top of the separator. Both of said spreaders 36 and 37 are prevented from turning during their axial adjustment by the stationary vertical rods 41 which extend through them and which are supported in sockets 41' in the bearing plate 42, fixed between the separator casing and said outlet fitting 35. I find it convenient to connect with the top of each tube 38 a fluid pressure gauge 38' to manifest to the operator the internal fluid pressure in each of the separators, individually.

Relative axial adjustment of said jet plates, fluid spreaders 36 and 37, is effected to predetermine and control both the volume and velocity of the flotation classifying fluid introduced to each separator, in accordance with the material to be classified therein.

Referring to Fig. I; the solid comminuted material to be classified is introduced to the separator 5 immediately above the jet plates 36 and 37 therein, and is tossed, washed and separated by the fluid injected into the separator between said plates. The heavier particles of the material gravitate down the interior conical surface of the separator into the fitting 35 and gravitate therefrom through the conduit 43 which includes a section of flexible hose 43'. As shown in Fig. I, said hose 43' is connected with the conduit 45 leading to the purifier 46 in which the material may be further washed with fluid supplied through the conduit 47. The purified material may be delivered from said purifier at different levels through any one of the several conduits 48 shown in Fig. I projecting from said purifier at different levels. However, if the material discharged from the separator through the hose 43' is in satisfactory condition for delivery without further purification; said hose 43' may be removed from the conduit 45 and connected with the conduit 50, shown in Fig. I, which is a branch of a manifold separator discharge conduit 51 having at the lower end thereof a rotatable adjustable nozzle 51' which may be turned as shown in Fig. I to overhang the railway car 53, supported for transportation on the tracks 54.

As shown in Fig. I, said manifold 51 is conveniently supported in rigid relation with the right hand column 2' by the bracket 55. The left hand column 2' shown in Fig. I is provided with a similar bracket 56 supporting the conduit manifold 57 which is similar to the manifold 51 and has at the lower end thereof the rotatable nozzle 57' similar to the nozzle 51'. As shown in Fig. I, the nozzle 57' overhangs the railway car 58 supported for transportation on the tracks 59. However, if the material discharged through the nozzle 57' includes an undesirable amount of water; said nozzle 57' may be turned to deliver the material into the dehydrater 60 from which the liquid may be discharged through the drain 61. The solid material may be discharged from said dehydrater 60 by the conveyer indicated at 62, conveniently driven by the electric motor 63, to deliver said material down the chute 63', which may be adjusted to overhang the car 58.

It is to be understood that in accordance with the volume and velocity of the water or other classifying fluid injected into the separator 5 through the axially opposed jet spreader plates therein, and the fluid pressure in the separator casing, which is variable as hereinafter described, more or less of the material to be classified is driven upward in the separator while other portions of said material are gravitating downward into the fitting 35, and the material thus levitated by flotation is driven centrifugally outward from the separator through the tangentially extending conduit 64 into the next higher separator casing. As indicated in Fig. II, I find it convenient to also include in the conduit 64 a flexible hose section 64'.

The material to be classified is thus separated by flotation and gravitation in as many of the vertically ascending series of separators as necessary to effect the desired classification. For instance, molding sand, or gravel, as mined, may be thus separated into different grades with reference to the size or specific gravity of their granules. Moreover, the apparatus shown may be used to eliminate culm from coal and classify the latter in accordance with the size of its lumps. Although such classification of sand, gravel and coal may be effected with water alone as the classifying fluid, I find that the flotation of coal may be facilitated by introducing sand to the separators with the classifying water. Moreover, classification of numerous other materials, for instance, vegetable grains, may be effected by the use of such apparatus, employing fluids other than water, for instance, atmospheric air.

Referring to Fig. VI; I find it convenient to provide means for forcibly delivering the material discharged from the classifier when it is desired to elevate the material above the level at which it is discharged. In said figure, the hopper 66 receives material from the classifier through the conduit 67. The material gravitates from said hopper through the conduit 68 into the centrifugal pump 69 from which it is discharged through the delivery conduit 70 when said pump is actuated by the electric motor 71. Said actuation may be automatically effected by the gravitation of the material from the conduit 67 against the plate 72 carried by the lever 73 which is normally counterbalanced by the weight 74 to present said plate as shown in Fig. VI. However, the material gravitating against said plate swings it in the direction of the arrow marked thereon in Fig. VI to operate the electric switch 75 to energize said motor 71. When the material ceases to gravitate upon the plate 72 the latter is restored to the position shown in Fig. VI in which said switch 75 is opened and the motor 71 and pump 69 stopped.

Referring to Fig. I, I find it convenient to provide the uppermost separator casing 12 with the fluid outlet conduit 77 which is supported at the right hand side of said tower and has the discharge outlet 77' at the bottom thereof. Also to provide the flotation fluid inlet conduit 15 with an outlet head casing 15' at the top thereof, containing the back pressure valve 78, holding a variable number of weights 78'; to variably predetermine the maximum pressure of fluid in said conduit 15. Said valve is opened by excess pressure to permit escape of fluid between its pendent guide bars 78", into the discharge conduit 79 which is supported in said tower and has the outlet 79' at the bottom thereof, opening into the drain conduit 80. Said single back pressure valve 78 is not only automatically operative by gravity, but is effective to control the back pressure of the flotation fluid in all of the apparatus between the pumps 16 and 27 and said discharge conduit 79, including the entire series of separator receptacles 5 to 12, inclusive. However, other arrangements may be made for discharging the surplus fluid from said separator casings, and if the flotation fluid is atmospheric air it may be discharged into the atmosphere.

As indicated in Fig. IV; said sump tank 29 is provided with a bottom drain outlet 80' leading into said drain 80 and normally closed by a vertical gate valve 81 which may be opened by a lever connected with the rock shaft 82 operable by the hand lever 83 connected therewith by the rod 84. I also find it convenient to provide said sump tank 29 with the overflow outlet 29' leading to said drain 80.

Referring to Figs. I, VII, VIII, and IX; said central fluid supply conduit 15 is connected with the centrifugal pump 16 by the T-fitting 16' which, as shown in Figs. VII and VIII, has the branch 16" leading into the sump tank 29. Escape of fluid from said conduit 15 into said tank 29 through said T-fitting branch 16" is controlled by the automatically rotatable plug valve 86. Said valve is cylindrical and has a plurality of fluid passageways 86' extending diametrically through it as shown in Figs. VIII and IX. Said valve 86 has the pulley 87 fixed on its stem and connected with means for rotating it, conveniently the pair of belts 88 which extend from said pulley 87 around the small pulley 89 on the shaft 90 which carries the larger pulley 91 connected by the belt 92 with the pulley 93 on the armature shaft of the electric motor 94. The effect of that construction and arrangement is to cause rhythmical pulsatory fluctuations in the fluid pressure in said conduit 15 and the individual separators 5, etc., connected therewith. It is to be understood, that when said valve 86 is shut, the centrifugal pump 16 causes the fluid pressure to increase in the conduit 15 and said separators, causing a corresponding increase in the levitating effect of said fluid upon the particles of solid material subjected to its flotation effect, whereas, when said valve 86 is momentarily opened to permit the escape of fluid from said conduit 15 through said T-branch 16", the levitation effect of the fluid is correspondingly diminished; so that the particles of solid matter are alternately tossed up and permitted to gravitate down in said fluid with the effect of facilitating the separation thereof more rapidly than if the classifying fluid were not subjected to such fluctuations in pressure.

Moreover, it may be observed that the method of operation above described includes progressing, by means of the pump 27, a supply of the material which is to be separated, in and by a flotation fluid, into a separate supply of flotation fluid delivered into the apparatus by the pump 16, and maintaining said flotation fluids at respectively different velocities and pressures and precipitating particles of the material from the first flotation fluid through the second flotation fluid; the granular size of the material precipitated being predetermined by the difference in the velocity and pressure of the two fluids; such precipitation being effected in successive stages at successively higher levels in the second flotation fluid; the size of the granules precipitated at successive stages being predetermined by the relative differences in the specific gravity of the material and flotation fluid at successively higher levels; the gravity of the material to be separated being relatively increased in relation to the gravity and velocity of the flotation fluid at successively higher levels. That method of separation is facilitated and rendered more rapid by causing rhythmical pulsatory fluctuations in the pressure of the flotation fluid, as above described.

However, I do not desire to limit myself to the precise details of construction, arrangement and method of operation herein set forth as it is obvious that various changes and modifications may be made therein without departing from the

I claim:

1. In means for separating particles of solid material by flotation; the combination with a conical separator casing having its apex downward; of an inlet conduit for the material to be separated, extending tangentially into the side of said casing; an inlet conduit for the flotation fluid, extending upward into the bottom of said casing, in coaxial relation therewith and having a circular, horizontally disposed, flotation fluid jet spreader plate at the top thereof; screw means for vertically adjusting said spreader with respect to said casing; a second spreader plate, axially opposed to said first plate; screw means for vertically adjusting said second spreader plate with respect to said first plate and thereby varying the area of the fluid passage between them; outlet means at the bottom of said casing, below said first plate; an outlet conduit extending tangentially from the upper part of said casing; means for injecting jets of flotation fluid into said casing from between said plates; whereby, comminuted material, inlet tangentially to said casing, is separated therein, part thereof gravitating to and through said bottom outlet and part thereof being discharged by flotation upwardly to and through said upper outlet.

2. Apparatus as in claim 1; wherein, rotation of said jet plates is prevented by rod means extending through them parallel with the axis of said casing.

3. In means for separating particles of solid material by flotation; the combination with a conical separator casing having its apex downward; of an inlet conduit for the material to be separated, extending laterally into the side of said casing; an inlet conduit for the flotation fluid, extending upwardly into the bottom of said casing, in coaxial relation therewith; means for delivering flotation fluid through said fluid conduit into said casing, under pressure; and means for causing rhythmical pulsatory fluctuations in such pressure.

4. The combination of a series of structures each comprising a conical separator casing having its apex downward, an inlet conduit for the material to be separated, extending laterally into the side of said casing, and an inlet conduit for the flotation fluid, extending upwardly into the bottom of the casing, in coaxial relation therewith; means for delivering flotation fluid through said fluid conduit into the casing, under pressure; said casings being disposed at successively higher levels, each having an upper outlet, and with the upper outlet of the lower one connected with the lower lateral inlet of the next higher one including single automatically operative gravitative valve means to variably limit, predetermine and control the back pressure of the flotation fluid in each separator of the series, for predetermining the size of the particles precipitated in said fluid; whereby, flotation fluid inlet at the lowermost casing is caused to circulate therein in a circular path concentric with the axis of said casing and passes thence in succession through the other casings at higher levels, in the same manner, and is discharged from the uppermost casing, and solid material of different grades is separated from the flotation fluid by the centrifugal effect of the circulation of the latter and discharged from the lower outlets of the successive casings.

5. The combination of a series of structures as described in claim 3; disposed at successively higher levels, each having an upper outlet, and with the upper outlet of the lower one connected with the lower lateral inlet of the next higher one; including single automatically operative valve means to variably limit, predetermine and control the back pressure of the flotation fluid in each separator of the series; whereby, flotation fluid inlet at the lowermost casing is caused to circulate therein in a circular path concentric with the axis of said casing and passes thence in succession through the other casings at higher levels in the same manner, and is discharged from the uppermost casing, and solid material of different grades is separated from the flotation fluid by the centrifugal effect of the circulation of the latter and discharged from the lower outlets of the successive casings.

6. In apparatus for separating particles of solid material by flotation; the combination with a series of separator casings each having an inlet for material to be separated, an inlet for the flotation fluid, an outlet near the top thereof for the levitated portion of said material, and an outlet near the bottom thereof for the precipitated portion of said material; said separator casings being disposed at successively higher levels; of pump means for delivering flotation fluid, under pressure into the lowermost casing and thence into casings at successively higher levels; and means for causing rhythmic pulsatory fluctuations in the fluid pressure, in the individual saparators.

7. In apparatus for separating particles of solid material by flotation; the combination with a series of separator casings each having an inlet for material to be separated, an inlet for the flotation fluid, an outlet near the top thereof for the levitated portion of said material, and an outlet near the bottom thereof for the precipitated portion of said material; said separator casings being disposed at successively higher levels; of pump means for delivering flotation fluid, under pressure into the lowermost casing and thence into casings at successively higher levels; and means for causing rhythmic pulsatory fluctuations in the fluid pressure, in the individual separators, including a branch outlet from said flotation fluid supply conduit between said pump and the lowermost casing, a rotary valve controlling the escape of such fluids through said branch, and means for rhythmically opening and shutting said valve.

8. The combination of a series of structures as described in claim 1; disposed at successively higher levels, each having an upper outlet, and with the upper outlet of the lower one connected with the lower tangential inlet of the next higher one; whereby, flotation fluid inlet at the lowermost casing passes thence in succession through the other casings at higher levels and is discharged from the uppermost casing, and solid material of different grades is uniformly distributed and subjected to the head and velocity pressure emitted from the flotation fluid jet spreader plates by the centrifugal effect of circulation of the fluid material; and the solid material of different grades precipitated through the flotation fluid and discharged from the lower outlets of the successive casings.

9. In apparatus for separating particles of solid material by flotation; the combination with a vertical tower; of a circular series of separator casings disposed at different levels and in concentric helical relation in said tower; each of said casings having an outlet conduit extending laterally from the upper end thereof to the next higher casing, in tangential relation to the latter; an inlet conduit for material to be separated extending laterally into the side of the lowermost casing; pump means for progressing a supply of the material which is to be separated in and by a flotation fluid into said inlet conduit of the lowermost casing; an inlet conduit for a second flotation fluid, extending vertically in coaxial relation with said tower and having branches respectively connected with the lower ends of said casings; and separate pump means for supplying a second flotation fluid through said axial conduit into said casings; whereby, material is precipitated from said first flotation fluid through said second flotation fluid in each of said casings; the granular size of the material precipitated being predetermined by difference in the velocity and pressure of the two fluids; the size of the granules precipitated at successive stages of elevation being predetermined by the relative differences in the specific gravity of the material and the specific gravity and velocity of the flotation fluid at successively higher levels.

RUSSELL SCOTT ELLIS.